Sept. 15, 1953          J. WYSSEN          2,652,157
OVERHEAD LOG CARRIER
Filed May 14, 1947          3 Sheets-Sheet 1
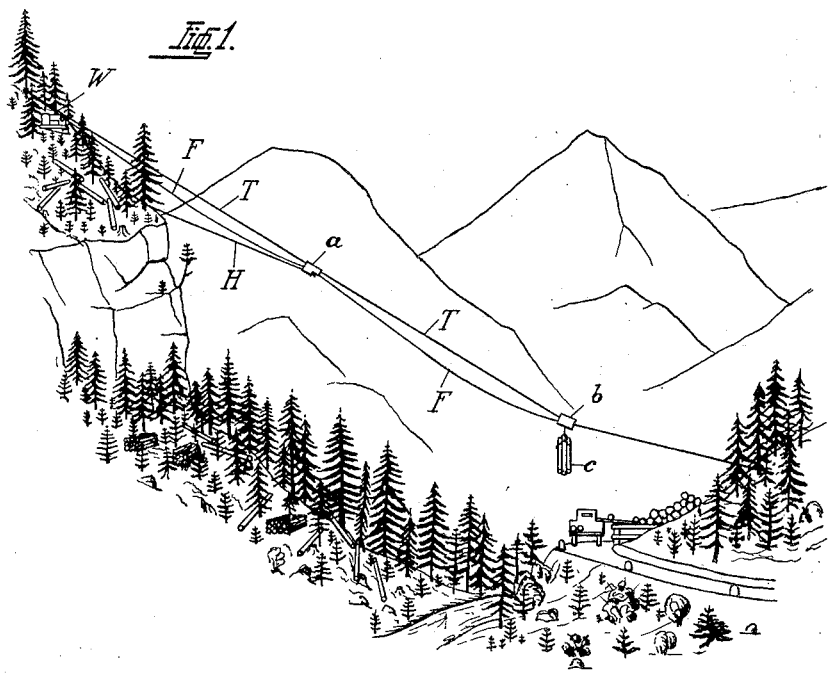
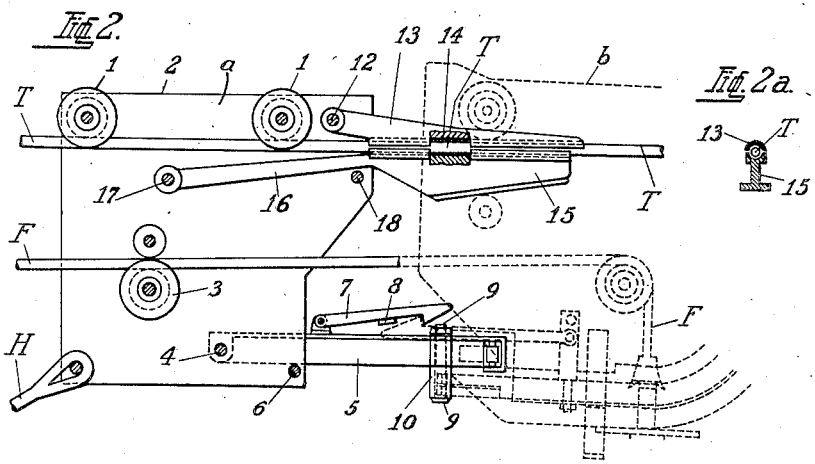
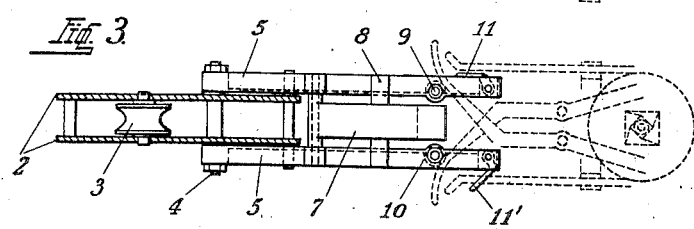
INVENTOR
JAKOB WYSSEN
BY Otto Munk
HIS ATTY Sept. 15, 1953           J. WYSSEN           2,652,157
OVERHEAD LOG CARRIER
Filed May 14, 1947           3 Sheets-Sheet 2
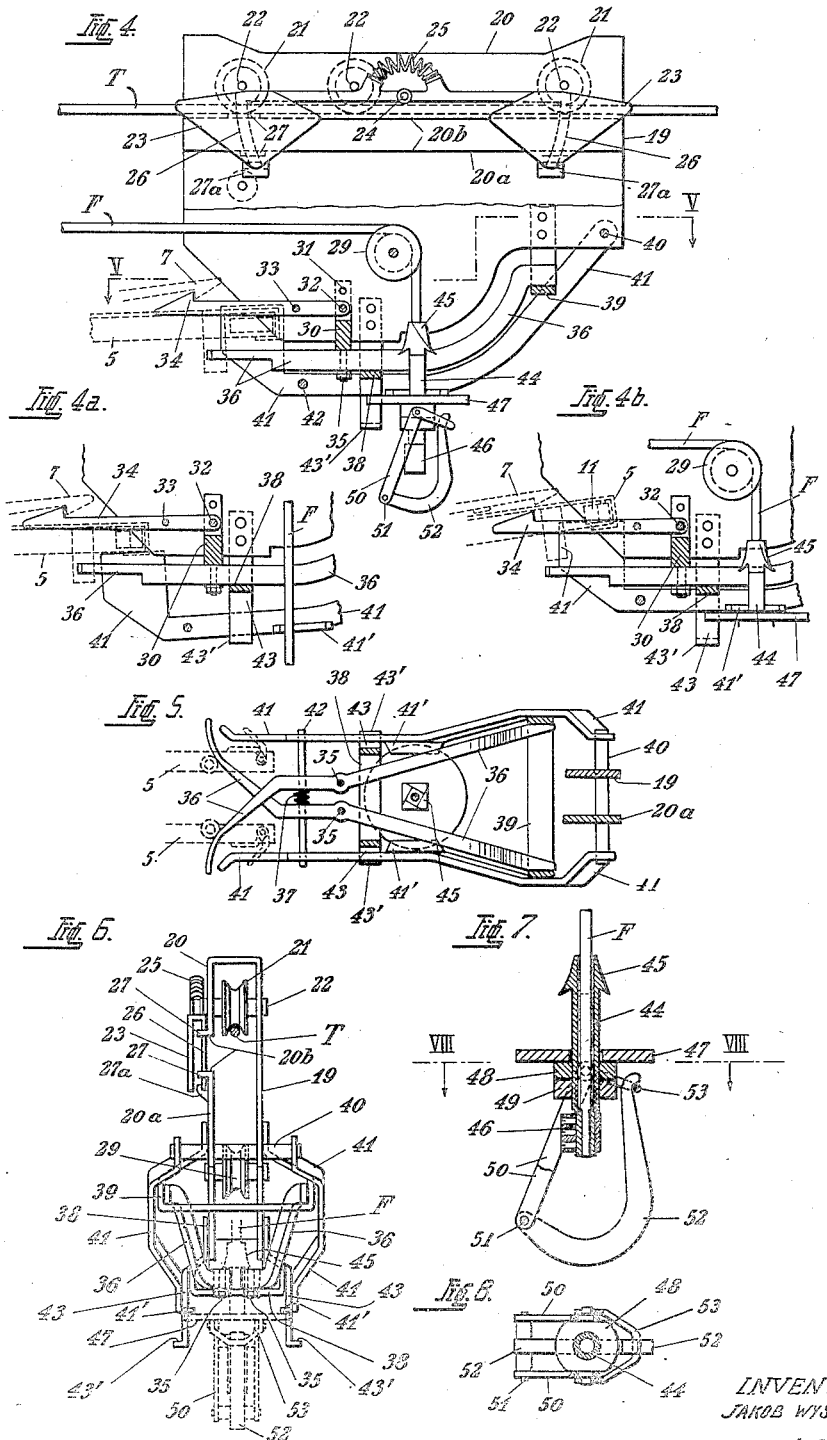
INVENTOR
JAKOB WYSSEN Sept. 15, 1953 J. WYSSEN 2,652,157
OVERHEAD LOG CARRIER
Filed May 14, 1947 3 Sheets-Sheet 3
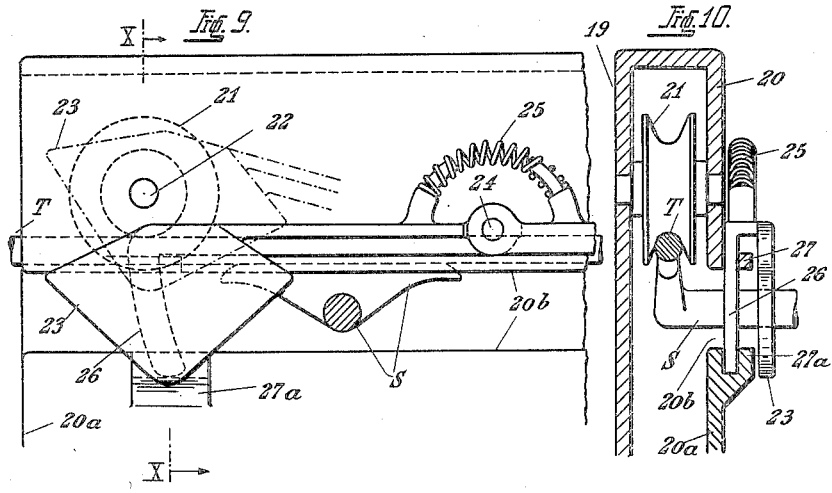
INVENTOR
JAKOB WYSSEN
BY Otto Munk
HIS ATTY Patented Sept. 15, 1953

2,652,157

UNITED STATES PATENT OFFICE 2,652,157

OVERHEAD LOG CARRIER

Jakob Wyssen, Reichenbach, Kandertal, Switzerland

Application May 14, 1947, Serial No. 747,956
In Switzerland April 13, 1940

Section 1, Public Law 690, August 8, 1946
Patent expires April 13, 1960

6 Claims. (Cl. 212—98)

This invention relates to an overhead carrier for the vertical hauling and conveying of loads along a carrier cable by means of a travelling carrier, a hoisting and hauling rope being provided for lifting loads and for hauling them by means of the travelling carrier. The substance of the invention is that the travelling carrier is provided with control elements operating regardless of the steepness of the carrier-cable incline to fasten the load hitching tackle to the travelling carrier, to haul this tackle vertically and to couple the travelling carrier with a control attachment fitted to the carrier cable and to release this attachment from the carrier cable, the control attachment being displaceable along the carrier cable by means of a mooring rope which is anchored to the ground, and a part of the unit consisting of travelling carrier and control attachment being provided with clamping controls which, operated from the other part of the unit, clamp or release themselves to or from the carrier cable.

Transport installations known hitherto for vertical hauling and conveying loads along a carrier cable, the travelling carrier of which is moved by means of a hauling rope, are provided at the loading point with a stop which is fastened to the carrier cable. If the loading point is to be moved, it is necessary to climb as far as the point where the stop is fitted to the carrier cable, to release this stop and to fix it again at the new loading point location. In instances where this stop is situated at a considerable height above the ground, this operation can be extremely difficult, and under certain circumstances quite impossible to perform. Moreover, as the conventional travelling carrier is not provided with controls designed to couple it to the stop from above when starting, there is a risk, particularly in case of slight carrier-cable inclines, for the travelling carrier, when attempting to hoist the load, to travel along the carrier cable in the upward direction, dragging the load along the ground instead of lifting it overhead.

The present invention is designed to avoid the above mentioned disadvantages; the overhead carrier according to this invention enables loads to be hoisted to the carrier cable in a vertical direction and from loading points distributed at either side, and to convey these loads along the carrier cable to a valley or mountain unloading terminal.

The set of drawings appended shows an embodiment of a cable-way installation operating according to this invention.

Fig. 1 is a general perspective view of such an installation,

Fig. 2 is a vertical section showing the control-attachment,

Fig. 2a a cross section view of the clamping elements of the control attachment, Fig. 3 is a plan view, partly in section of the control attachment, Fig. 4 is in part a side view partly in section of a travelling carrier, Figs. 4a and 4b are fragmentary views of the carrier of Fig. 4, showing different positions of certain parts.

Fig. 5 is a horizontal sectional view of the travelling carrier, taken along the line V—V of Fig. 4, the front lateral walls of the housing being in part omitted, Fig. 6 is an end view of the travelling carrier, as seen from the right of Fig. 4, Fig. 7 is a vertical sectional view of the shackle, and Fig. 8 a horizontal sectional view of the same, as per line VIII—VIII of Fig. 7, Fig. 9 is an enlarged fragmentary view similar to Fig. 4.

Fig. 10 is sectional view taken along the line X—X of Fig. 9.

The carrier cable T is conducted down the mountainside passing over standards S (Figs. 9 and 10) which may be fastened to trees, for instance. At a suitable spot on the ground, vertically below the carrier cable T, a rope winch W is located, which is usefully driven by a motor and provided with several gear ratios. As shown on Figs. 1 to 3, the control attachment $a$ is provided with two rope sheaves 1 which are located between two vertical bearing plates 2 and run on the carrier cable T. By means of a mooring rope H, one end of which is fastened to the control attachment, the other being anchored to the ground, the control attachment can be shifted along the carrier-cable T, and fixed above the load to be hoisted from the ground. The control attachment $a$ is provided with a hauling-rope guide-pulley 3, which is located within the frame 2 and over which the hauling and hoisting rope F runs in one direction towards the rope winch W and in the opposite direction towards the travelling carrier $b$. An angle-section double rail 5 is hinged to a pivot pin 4 on the frame 2 from which it protrudes; this double rail rests on a stop pin 6 and can thus swing in an upward direction only. A hinged latch or coupling member 7 is pivoted to the double rail 5 and provided with a cross piece 8 which prevents the coupling member 7 from swinging downwards between the arms of the double rail. A pair of rollers 10 are mounted by screw bolts 9 on the two upper sides of the double rail 5. The two arms of the double rail are each provided at their outer ends with a U-shaped extension within which is pivotally mounted an outwardly spring pressed lever 11. Fig. 3 shows lever 11 when under spring tension, whereas at 11' its position when laterally swung out by spring action is indicated. Within the frame 2 a clamp or cable gripping jaw 13 is pivoted to a pin 12 located above the carrier cable; this gripping jaw being provided with a groove designed to fit the cable contour, and with a lining 14, which can be made of rubber or soft metal. The lower gripping jaw 15 has the cross-sectional shape of a double-T (Fig. 2a), and is pivoted at 17 through its extending portion 16; a stop pin 18 limits the downward swing to an amount sufficient to clear the carrier cable T. The surface of the lower gripping jaw which fits the contour of the carrier cable has a shape corresponding to that of the upper half.

The travelling carrier is provided with a frame consisting of three vertical side wall plates 19, 20 and 20a. Plates 19 and 20 are rigidly assembled together in spaced relationship, and plates 20 and 20a, which are coplanar, are located one above the other, and their adjacent edges are spaced providing a longitudinal slot 20b, which enables the travelling carrier to be fitted sidewise on to the carrier cable T. Between the lateral wall plates 19 and 20 three rope sheaves 21 are located at the same height one behind the other on axlepins 22. In the event of violent swinging of the carrier cable, the travelling carrier is liable to be jerked off sidewise through the slot 20b, which is provided for the purpose of permitting the carrier to pass the cable supporting standards S. A safety device is provided to prevent this occurrence, and this safety device is controlled automatically by the standards, normally closing slot 20b. This is shown on an enlarged scale in Figs. 9 and 10. It comprises a pair of vertical bridging plates 23 with pointed extremities, pivoted to a common pivot pin 24. The plates 23 are urged into their slot closing position by means of a common compression spring 25. At the inner side of the plates 23 and spaced therefrom, are arcuate guide arms 26 which are freely movable through apertures 27 in an outwardly extending portion of plate 20 at the upper edge of the slot 20b. A hook shaped notch 27a supports the guide arms 26 in the slot-closing position of plates 23 and secures these against outward displacement from the wall 20a of the carrier housing. When the carrier passes a standard S, the plates 23 are successively forced upwardly by the standard, against spring pressure, and then successively brought back into their slot-closing positions as the carrier clears the standard. The hauling-rope guide-pulley 29 is located approximately at the longitudinal center of the carrier framework. A support 30 is fixed to the housing by means of screws 31 and a bolt 32 between the two lateral walls 19 and 20a of the carrier framework. Bolt 32, together with a second bolt 33, carry the fixed latch or coupling member 34. The support 30 is provided with two screw pins 35 projecting downwards and carrying the two pivotally mounted levers of the holding shear 36. A compression spring 37 located between the arms of the shear 36 urges these normally to close. As during the transport stage (as distinct from the hoisting stage) the shear 36 must carry the load weight, it is supported by two cross bars 38 and 39 which are located below and solidly connected with the housing walls 19, 20a. A pair of levers 41 is hinged to the ends of a pivot pin 40 which passes through the carrier frame and protrudes at either side. Levers 41 are arranged laterally outside and below the shear 36. Levers 41 are moreover held together by a pin 42. The downward swing of levers 41 is limited by a stirrup-shaped stop-type strip 43, 43' which is fitted to the carrier frame 19, 20; their vertically extending portions acting as guides for the levers 41.

A vertical sleeve 44 connecting to the downwardly extending end of the hauing rope F is releasably disposed between the two arms of the shear 36, the top of this sleeve being provided with a square-section head 45. The bottom square of this head is larger than the top square and is angularly displaced therefrom by 10 to 20 degrees, so that the vertical edges connecting the bottom and top squares are steeply pitched helical lines. This shape is provided for the purpose of turning head 45 into its correct position with respect to the shear arms as it comes into contact with the housing walls while the load is being hoisted. In order to reduce the risk of head 45 slipping from the arms of the shear 36 when this is closed, in case the edges at the bottom of the head are worn out, the under side of the bottom square is usually shaped not as a plane surface, but with bevel-cut outer edges extending downwards. The end of the hauling rope F is introduced into the rope sleeve 44 and secured by means of the rope clamp 46.

A wide disc 47 is slipped onto the rope sleeve 44 from below; its purpose being to lift the pair of levers 41. This wide disc rests on a swivel disc 48, which is also slipped on to the rope sleeve 44 from below and carries the shackle parts 50 and the brace 53 by two laterally extending studs. Disc 48 rests on a nut 49, which can be turned to change its position on the externally threaded lower portion of rope sleeve 44 and thus enables the automatic shackle operation to be adjusted. The two shackle arms 50 are connected by the pivot pin 51, to which the load carrying hook 52 is also connected; this being maintained in its closed position by the brace 53. The shackle as described has the advantage that upward movement of the brace 53 allows the hook 52 to swing downward, thus releasing the load from the hauling rope, and obviating the necessity of placing the load on a special support prior to its being released.

The following is a discription of the operation of such an installation. Initially, the control attachment a is brought to the required point along the carrier cable T and secured at this point by means of the mooring rope H. The travelling carrier is located at the valley discharge terminal, suspended on the carrier cable T. Shear 36 is closed under the action of spring 37, so that the rope sleeve head 45 rests on both arms of the shear 36. Disc 47 retains the pair of levers 41 in their upper position by engagement with their inwardly projecting ear portions 41'. The hauling rope F runs out from the sleeve head 45 and passes over pulley 29 and pulley 3 towards the winch W. The hauling rope F is then wound up by means of the winch W, which causes the travelling carrier to move mountainwards. As the carrier b reaches the control attachment a, the rope sheave 21 located mountainwards runs onto the upper gripping member 13 of the control attachment, the lower gripping member 15 being forced upwardly by a roller shown dotted in Fig. 2, thus clamping the control attachment securely to the carrier cable T. Simultaneously coupling member 34 has engaged coupling member 7 (Fig. 4a) thus coupling the control attachment $a$ to the travelling carrier $b$. Rollers 10 open the shear 36, overcoming pressure of spring 37, so that sleeve head 45 is released and is now freely suspended by the hauling rope F. The pair of levers 41 has engaged the spring pressed levers 11 carried by the double rail 5, for the time being without effect. When the hauling rope F is unwound by the winch W, this causes shackle 50—53 to be lowered and with it the wide disc 47. The pair of levers 41 then drops into its lower stop position, so that the spring pressed levers 11 move outwardly into their position 11', where they may be engaged by the pair of levers 41 as these move upwardly. The load having been hitched to the shackle, the hauling rope F is again drawn in and the load is hoisted. As the shackle reaches the travelling carrier, sleeve head 45 rises between the arms of the opened shear 36. Disc 47 lifts the pair of levers 41 and thus engages the spring pressed levers 11 as well as the double rail 5 by which they are carried. The upward motion of the double rail 5 causes (1) rollers 10 to disengage the shear arms 36, so that these close under spring pressure, and (2) the coupling member 7 to be lifted from engagement with coupling member 34 of the travelling carrier, thus causing the control attachment $a$ to be detached from the travelling carrier. When the hauling rope is then unwound again, the rope sleeve head 45 with the hoisted load $c$ is supported by the closed shear 36, and travelling carrier $b$ moves towards the valley terminal with the load $c$ (Fig. 1). Upon arrival at the valley terminal, the brace 53 of the shackle is forced upwards manually or otherwise, thus causing hook 52 to swing downwards around pivot pin 51, releasing the load $c$.

The transport installation as described might also be used for hauling goods in the reverse direction, i. e. towards a mountain terminal, so that the lowermost terminal A in Fig. 1 could be a loading as well as unloading terminal.

What I claim is:

1. An overhead carrier of the class described, comprising: a carrier cable; a control attachment freely movable along said cable; a mooring cable connected to said control attachment for fixing the position thereof along said carrier cable; gripping means included in said control attachment and engageable with said carrier cable, said gripping means having a surface whereby said gripping means may be actuated to grip said cable; a first coupling means carried by said control attachment; a travelling carrier movable along said carrier cable; a hoisting and hauling rope extending generally in the same direction as said carrier cable and movably passing through said travelling carrier and comprising a portion extending downwardly therethrough; load lifting shackle means secured to the end of said downwardly extending portion of said hoisting and hauling rope and comprising an engageable portion; releasable holding means disposed in said travelling carrier and engageable with said engageable portion of said shackle means for supporting the same during movement of said travelling carrier along said carrier cable; a second coupling means disposed on said travelling carrier and engageable with said first coupling means; means carried by said travelling carrier which actuates said gripping means; means included in said control attachment and engageable with said holding means for releasing said shackle means; and means included in said travelling carrier and actuable by said shackle means upon rising into engagement therewith for disengaging said first and second coupling means from each other and causing said holding means to engage said engageable portion of said shackle means.

2. An overhead carrier according to claim 1, wherein said main cable is supported by a cable support having a horizontally extending portion, and wherein said travelling carrier has a horizontal longitudinal slot in one side thereof for passage therethrough of said horizontal portion of said cable support, further comprising: movable slot closing means for said slot having a surface engageable with said horizontal portion of said cable support for moving said slot closing means to open said slot; and spring means for maintaining said slot closing means in slot-closing position.

3. An overhead carrier according to claim 1, wherein said gripping means comprises a pair of gripping jaws having tapered surfaces and said travelling carrier comprises means engageable with said tapered surfaces for forcing said jaws together to grip said cable.

4. An overhead carrier of the class described, comprising: a carrier cable; a control attachment freely movable along said cable; a mooring cable connected to said control attachment for fixing the position thereof along said carrier cable; gripping means included in said control attachment and engageable with said carrier cable, said gripping means having a surface whereby said gripping means may be actuated to grip said cable; a first latchable coupling means carried by said control attachment; a travelling carrier movable along said carrier cable; a hoisting and hauling rope extending generally in the same direction as said carrier cable and movably passing through said travelling carrier and comprising a portion extending downwardly therethrough; load lifting shackle means secured to the end of said downwardly extending portion of said hoisting and hauling rope and comprising a shouldered headed portion; releasable holding means comprising a pair of laterally movable levers disposed in said travelling carrier and engageable with said shouldered headed portion of said shackle means for supporting the same during movement of said travelling carrier along said carrier cable; a second latchable coupling means disposed on said travelling carrier and engageable with said first coupling means; means carried by said travelling carrier which actuates said gripping means; means included in said control attachment and engageable with said holding means for releasing said shackle means; and means included partly in said travelling carrier and partly in said control attachment and actuable by said shackle means upon rising into engagement therewith for unlatching said first and second coupling means from each other and causing said holding means to engage said shouldered headed portion of said shackle means.

5. An overhead carrier according to claim 4, wherein said laterally movable levers are arranged in the form of a shear.

6. An overhead carrier according to claim 5, wherein said control attachment comprises a pair of rollers engageable with said levers to open said shear.

JAKOB WYSSEN.

References Cited in the file of this patent

UNITED STATES PATENTS

| Number | Name | Date |
|---|---|---|
| 688,475 | Miller et al. | Dec. 10, 1901 |
| 864,637 | Fox et al. | Aug. 27, 1907 |
| 1,140,725 | Waddell | May 25, 1915 |
| 1,270,131 | Ellis | June 18, 1918 |
| 1,322,074 | Venable | Nov. 18, 1919 |
| 1,343,434 | Cook | June 15, 1920 |
| 1,504,753 | Guerin | Aug. 12, 1924 |
| 1,693,523 | Milotte | Nov. 27, 1928 |
| 2,173,127 | Nelson | Sept. 19, 1939 |

FOREIGN PATENTS

| Number | Country | Date |
|---|---|---|
| 569,251 | Germany | Feb. 2, 1933 |